(12) United States Patent  (10) Patent No.: US 8,453,124 B2
Alexander et al.  (45) Date of Patent: May 28, 2013

(54) COLLECTING COMPUTER PROCESSOR INSTRUMENTATION DATA

(75) Inventors: Gregory W. Alexander, Pflugerville, TX (US); Jane Bartik, Poughkeepsie, NY (US); Michael Billeci, Poughkeepsie, NY (US); David Hutton, Tallahassee, FL (US); Christian Jacobi, Poughkeepsie, NY (US); Jang-Soo Lee, Poughkeepsie, NY (US); Eric Schwarz, Gardiner, NY (US); Chung-Lung Shum, Wappingers Falls, NY (US); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 12/645,687

(22) Filed: Dec. 23, 2009

(65) Prior Publication Data

US 2011/0154298 A1  Jun. 23, 2011

(51) Int. Cl.
*G06F 9/44* (2006.01)
(52) U.S. Cl.
USPC .......... 717/130; 717/124; 717/125; 717/126; 717/127; 717/128; 717/129
(58) Field of Classification Search
USPC ....................................................... 717/130
See application file for complete search history.

(56) References Cited

U.S. PATENT DOCUMENTS

| | | | |
|---|---|---|---|
| 6,195,748 B1 | 2/2001 | Chrysos et al. | |
| 6,553,480 B1 * | 4/2003 | Cheong et al. | 712/23 |
| 6,574,727 B1 | 6/2003 | Davidson et al. | |
| 6,748,522 B1 | 6/2004 | Gregorie et al. | |
| 7,047,398 B2 | 5/2006 | Kurihara et al. | |
| 7,418,581 B2 | 8/2008 | Chaudhry et al. | |
| 2007/0006167 A1 | 1/2007 | Luk et al. | |
| 2007/0261034 A1 * | 11/2007 | Chen et al. | 717/130 |
| 2009/0259830 A1 | 10/2009 | Indukuru et al. | |

OTHER PUBLICATIONS

Kapil Vaswani and Y. N. Srikant and Matthew J. Thazhuthaveetil, Architectural Support for Online Program Instrumentation, Jun. 4, 2004, Bangalore, India.

* cited by examiner

*Primary Examiner* — Li B Zhen
*Assistant Examiner* — Lenin Paulino
(74) *Attorney, Agent, or Firm* — Fleit Gibbons Gutman Bongini & Bianco PL; Jefffrey Giunta

(57) ABSTRACT

A system and method for collecting instrumentation data in a processor with a pipelined instruction execution stages arranged in an out-of-order execution architecture. One instruction group in a Global Completion Table is marked as a tagged group. Instrumentation data is stored for processing stages processing instructions associated with the tagged group. Sample signal pulses trigger a determination of whether the tagged group is the next-to-complete instruction group. When the sample pulse occurs at a time when the tagged group is the next-to-complete group, the instrumentation data is written as an output. Instrumentation data present during sample pulses that occur when the tagged group is not the next-to-complete group is optionally discarded. Sample pulses are generated at a rate equal to the desired sample rate times the number of groups in the global completion table to better ensure occurrence of a next-to-complete tagged group.

20 Claims, 4 Drawing Sheets

US 8,453,124 B2

COLLECTING COMPUTER PROCESSOR INSTRUMENTATION DATA

FIELD OF THE INVENTION

The present invention generally relates to collecting computer processor instrumentation data and more particularly to collecting detailed instrumentation data in a superscalar pipelined, out-of-order execution processor.

BACKGROUND OF THE INVENTION

Several current microprocessor designs incorporate superscalar, pipelined, out-of-order execution architectures. Such architectures simultaneously handle multiple instruction groups of one or more programs that are distributed to multiple pipeline processing stages of the processor. Such architectures are also able to distribute instructions to the various processing stages in orders other than that specified by the program, subject to instruction dependencies.

Processing instrumentation is incorporated into microprocessors to support analysis of executing programs by, for example, facilitating identification of processing performance bottlenecks for the computer program being analyzed. Common instrumentation techniques include collecting instrumentation data at a period related to the processing cycle time of the microprocessor. For example, instrumentation data for the instruction currently executing in the pipeline of the microprocessor is collected upon an occurrence of a sample pulse that is provided every one million processing cycles of the microprocessor. The collected instrumentation data can include, for example, the instruction's opcode and what is causing that instruction to stall. Reasons for an instruction's stalling include, for example, waiting for a data dependency or a cache miss.

Typically, there are many instructions executing at a given time in a superscalar, pipelined, out-of-order execution microprocessor. In assessing processing bottlenecks, the best indication of which stalls are delaying the processor, versus ones that may be hidden by other instructions, is to look at the Next-To-Complete (NTC) instruction or group of instructions. Given that instrumentation data samples are taken at random times to not skew the observed results, it is difficult to collect information about the NTC group of instructions without collecting information on all instructions active in the pipeline. There are typically many instructions being simultaneously handled by the processor and active in the processing pipeline of a superscalar, pipelined, out-of-order execution microprocessor and there are many stages of the processing pipeline that require monitoring for instruction stall conditions. Staging the stall conditions through the pipeline often adds complexity as the size of the pipeline and the number of simultaneously active instruction groups increases. For example, in a pipeline that is around twenty processing cycles long with a stall occurring for an instruction during processing at cycle six of the pipeline, the condition for that stall is required to be staged for fourteen cycles to the completion cycle of that instruction to properly indicate why the group of instructions including that stalled instruction may not be completing. Such staging for all required processing pipeline stages and for all active instructions requires a large amount of latches to implement. This complexity increases for out-of-order execution processing designs.

Therefore, a more efficient processing instrumentation architecture for superscalar, pipelined, out-of-order execution microprocessor is required to improve the processing performance monitoring of such processors.

SUMMARY OF THE INVENTION

In one embodiment, a method for collecting processor instrumentation data includes marking as a tagged instruction group, with a processor, one instruction group from within a plurality of instruction groups being simultaneously processed by the processor. The tagged instruction group is a subset of the plurality of instruction groups being simultaneously processed by the processor. The processor has a plurality of pipelined instruction execution stages arranged in an out-of-order execution architecture. The method further includes storing, by the processor in response to the marking, correlated instrumentation data for only the tagged instruction group. The correlated instrumentation data comprising instrumentation data associated with execution stages within the plurality of pipelined instruction execution stages that are processing the tagged instruction group. The method also includes accepting, at the processor, a sample signal and determining, at the processor in response to accepting the sample signal, that the tagged instruction group is indicated as a next-to-complete instruction group. The method additionally includes writing, in response to determining that the tagged instruction group is indicated as a next-to-complete group, the correlated instrumentation data. The method also includes providing, in response to accepting the sample signal and writing the correlated instrumentation data, the correlated instrumentation data as an instrumentation data output.

In another embodiment, a system for collecting processor instrumentation data includes an instruction processor that has a plurality of pipelined instruction execution stages arranged in an out-of-order execution architecture. The system further includes a group tagging processor that marks one instruction group from within a plurality of instruction groups being simultaneously processed by the processor as a tagged instruction group. The tagged instruction group is a subset of the plurality of instruction groups being simultaneously processed by the processor. The system also includes an instrumentation data staging circuit that stores, in response to the marking, correlated instrumentation data for only the tagged instruction group. The correlated instrumentation data comprising instrumentation data associated with execution stages within the plurality of pipelined instruction execution stages that are processing the tagged instruction group. The system additionally includes a sample signal input that receives a plurality of sample signal pulses and includes an instruction group status processor that determines, in response to the sample signal pulses, that the tagged instruction group is indicated as a next-to-complete instruction group. The system further includes an instrumentation data output that writes, in response to determining that the tagged instruction group is indicated as a next-to-complete group, the correlated instrumentation data. The instrumentation data output also provides, in response to accepting the sample signal and writing the correlated instrumentation data, the correlated instrumentation data as an instrumentation data output.

In another embodiment, a computer program product for collecting processor instrumentation data includes a computer readable storage medium having computer readable program code embodied therewith that includes computer readable program code configured to mark as a tagged instruction group one instruction group from within a plurality of instruction groups being simultaneously processed by the processor. The tagged instruction group being a subset of the plurality of instruction groups being simultaneously processed by the processor, the processor having a plurality of pipelined instruction execution stages arranged in an out-of-order execution architecture. The computer readable program code also includes computer readable program code configured to store, in response to the marking, correlated instrumentation data for only the tagged instruction group, the correlated instrumentation data comprising instrumentation data associated with execution stages within the plurality of pipelined instruction execution stages that are processing the tagged instruction group. The computer readable program code also includes computer readable program code configured to accept a sample signal and computer readable program code configured to determine, in response to accepting the sample signal, that the tagged instruction group is indicated as a next-to-complete instruction group. The computer readable program code additionally includes computer readable program code configured to write, in response to determining that the tagged instruction group is indicated as a next-to-complete group, the correlated instrumentation data. The computer readable program code also includes computer readable program code configured to provide, in response to accepting the sample signal and writing the correlated instrumentation data, the correlated instrumentation data as an instrumentation data output.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
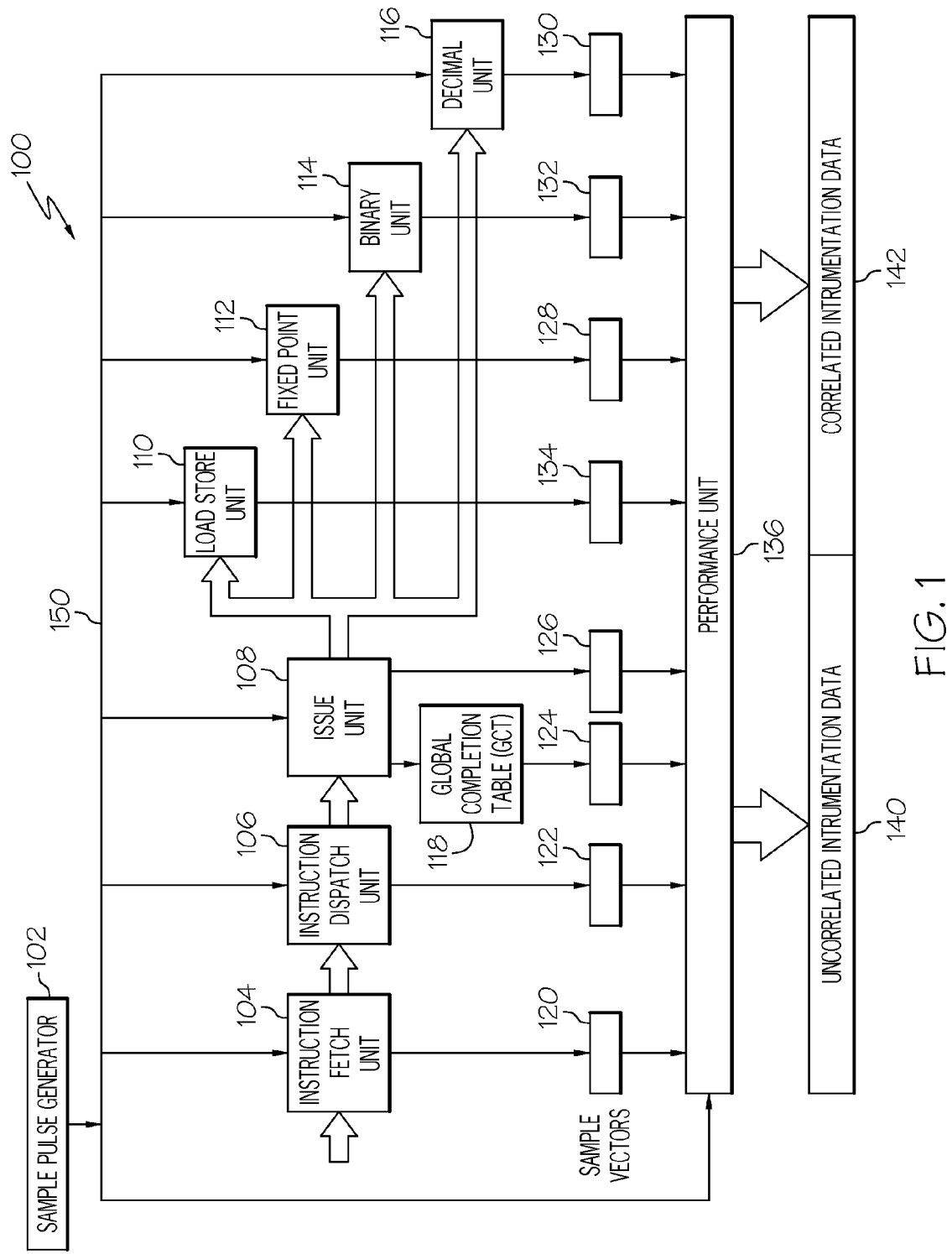
FIG. 1 illustrates a processing architecture of a processor that selectively collects instrumentation data for a tagged instruction group, in accordance with one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Presented is an instruction processing instrumentation architecture that tracks only one target group of instructions through the processing pipeline of a superscalar, pipelined, out-of-order execution. An example microprocessor is described that is able to have up to twenty-four groups of instructions in its processing pipeline. Each of these twenty-four groups are tracked though the use of a Global Completion Table (GCT). A target group tag is created to indicate which group of the GCT is to be tracked and, therefore, for which instruction group instrumentation data is to be stored. The target group tag is able to be a statically fixed value or a value that is periodically changed in a pseudo-random manor. When the target instruction group reaches a part of the pipeline for which instrumentation data is to be collected, instrumentation data on that instruction group is captured. In order to increase the likelihood that correct instrumentation data is collected, the sampling rate is increased over the desired sampling rate by an amount equal to the number of instruction groups that are concurrently processed by the processing pipeline. In other words, a processing design that is able to concurrently process M instruction groups and that may desire to have instrumentation data that is collected every N µS, the actual sampling is performed every N/M µS. One example microprocessor includes a processing pipeline that concurrently processes twenty-four instruction groups and the instrumentation data sampling rate is therefore performed at twenty four times the desired instrumentation sampling rate. One embodiment is further able to force a specified sample rate where sampling is halted for the remainder of the desired instrumentation sampling period once a valid sample is taken. In the example of desiring a sample every N µS, samples are taken every N/M µS but once a valid sample is obtained, the sampling stops for the remainder of the N µS sampling period. If no valid sample is taken up to the Mth sample, then the Mth sample is forced and its validity status is marked.

One embodiment further stages less detailed instrumentation data down the pipeline to facilitate indicating a stall in a pipeline stage that is causing processing problems. In such embodiments, the detailed instrumentation data is only captured for the target instruction group.

FIG. 1 illustrates a processing architecture of a processor 100 that selectively collects instrumentation data for a tagged instruction group, in accordance with one embodiment of the present invention. The processor 100 includes an Instruction Fetch Unit 104 that fetches instructions to be executed. The Instruction Fetch Unit 104 provides the instructions to an Instruction Unit 106 that decodes the instruction that was fetched. Once instructions are decoded, the resulting instructions are provided to an Issue Unit 108. Instruction groups being operated upon by processor 100 are maintained by use of a Global completion Table (GCT) 118. Instructions to be processed are issued from the ISU 108 to various processing units, such as a Load Store Unit 110, a Fixed Point Unit 112, a Binary Unit 114 and a Decimal Unit 116. Further processing units are generally included examples of processor 100, but are not shown herein in order to focus on the relevant portions of processor 100 regarding one embodiment of the present invention. As is understood by practitioners of ordinary skill in the relevant arts, the Load Store Unit 110, a Fixed Point Unit 112, a Binary Unit 114 and a Decimal Unit 116 of one embodiment are configured in an out-of-order processing pipeline architecture.

Each stage of processor 100 accepts a sample pulse 150 that is generated by sample pulse generator 102. As described below, sample pulse generator 102 generates sample pulses to indicate that instrumentation data is to be collected for selected tagged instruction group. The Instruction Fetch Unit 104, Instruction dispatch Unit 106, Issue Unit 108, Load Store Unit 110, a Fixed Point Unit 112, a Binary Unit 114 and a Decimal Unit 116 receive sample pulses 150 and store instrumentation data into corresponding sample vectors 120-134. In the illustrated example, the Instruction Fetch Unit 104 stores instrumentation data into an Instruction Fetch Unit sample vector 120, the Instruction dispatch Unit 106 stores instrumentation data into an Instruction Dispatch Unit sample vector 122, the Global completion Table (GCT) stores instrumentation data into a GCT sample vector 124, the Issue Unit 108 stores instrumentation data into an Issue Unit sample vector 126, the Load Store Unit 110 stores instrumentation data into a Load Store Unit sample vector 134, the Fixed Point Unit 112 stores instrumentation data into a Fixed Point Unit sample vector 128, the a Binary Unit 114 stores instrumentation data into a Binary Unit sample vector 132, and the Decimal Unit 116 stores instrumentation data into a Decimal Unit sample vector 130.

A performance unit 136 collects, in response to the sample pulse 150, the data contained in the sample vectors of each processing stage and assembles instrumentation data. The performance unit collects two types of instrumentation data, uncorrelated instrumentation data 140 and correlated instrumentation data 142. Correlated instrumentation data 142 includes a set of instrumentation signals that are tightly associated with instruction addresses. These signals are usually used to analyze software execution performance by finding hot spots of programs. Uncorrelated instrumentation data 140 includes a set of instrumentation signals that are not tightly associated with instruction addresses.

One embodiment of the present invention supports two methods to determine which instruction group in the Global completion Table (GCT) 118 is to be tagged as the instruction group to trace. A "Fixed Mode" uses a statically defined instruction group entry in the GCT 118 to identify the instruction group to be tagged. A "Random Mode" changes the target group after a sample where, for example, a sample pulse occurs and the target group matches the "Next To Complete" (NTC) group. In one embodiment, the next target group will be determined pseudo randomly. One embodiment operates by tagging one instruction group out of the several instruction groups in the GCT 118 and only collects and stages instrumentation data associated with that one tagged instruction group.

One embodiment further supports using one of three modes to write instrumentation data samples in response to the occurrence of a sample pulse. In one embodiment, sample pulses occur a multiple of times during each desired instrumentation sample interval in order to increase the likelihood of obtaining a valid instrumentation data sample where the tagged instruction group is the "next-to-complete" group at the time of the sample. This multiple is generally equal to the number of instruction groups that are concurrently processed by the processing pipeline of the processor, which is determined by the number of entries of the GCT 118. The combination of the two methods to determine which instruction group in the GCT 118 to be tagged and the three modes to write instrumentation data results in total of six different possible instrumentation data determination modes.

One embodiment of the present invention is able to write instrumentation data in a "Normal Compressed" mode where the performance unit 136 writes instrumentation data samples relating to the tagged instruction group only when the identified target group within the GCT 118 matches the "next-to-complete" instruction group at the time of the sample pulse. Instrumentation data is also able to be written in an "Expanded" mode where instrumentation data samples relating to the tagged instruction group are always written for every sample pulse. Instrumentation data relating to the tagged instruction group is also able to be written in a "Special Compressed" mode that writes only one sample during each desired instrumentation data sample interval, as is described in detail below.

Figure 2:
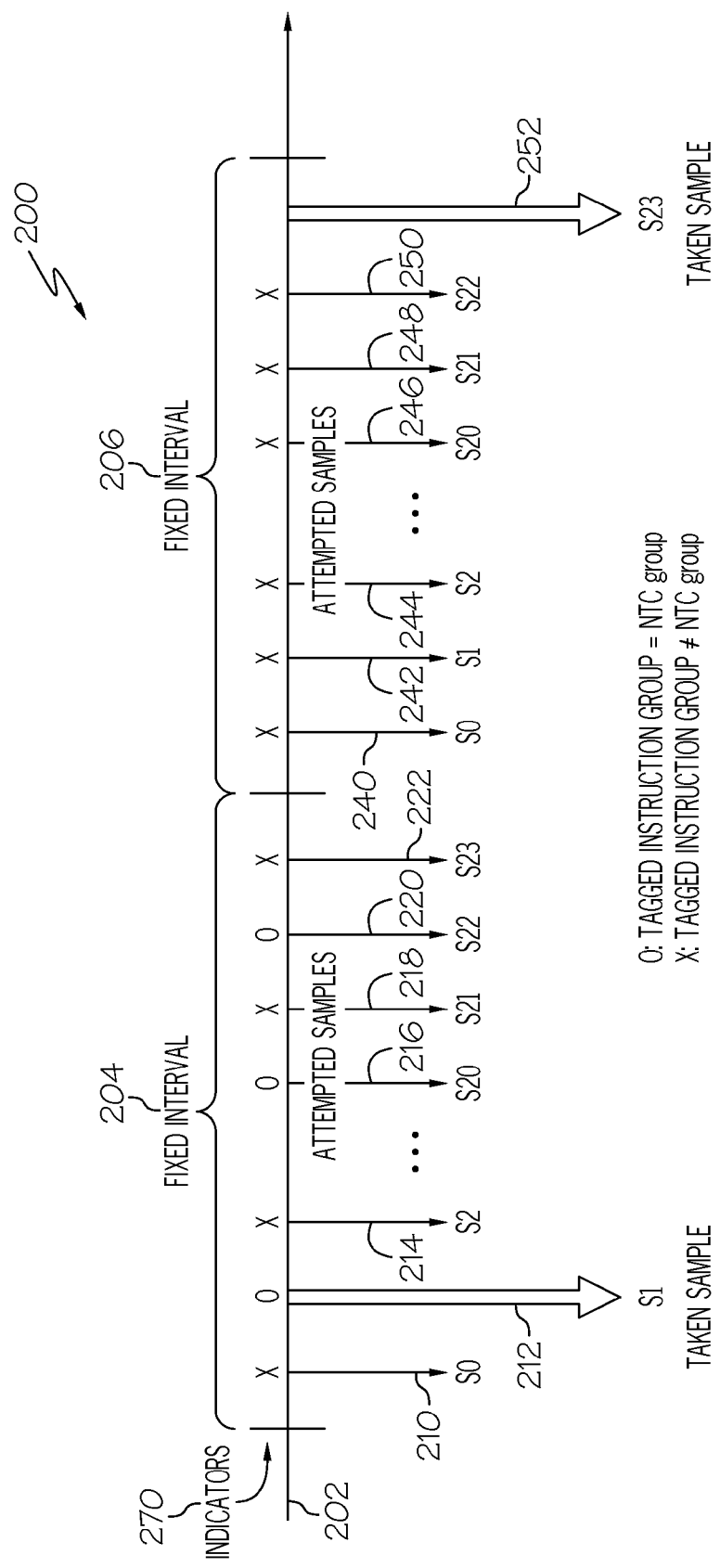
FIG. 2 illustrates special compressed mode instrumentation data writing timing, in accordance with one embodiment of the present invention.

FIG. 2 illustrates special compressed mode instrumentation data writing timing 200, in accordance with one embodiment of the present invention. In the special compressed mode instrumentation data writing timing 200, there are fixed intervals during which one set of instrumentation data is to be collected. The duration of these fixed intervals is referred to as a desired instrumentation data sample interval and is the inverse of a desired instrumentation data sampling rate that is chosen by the user of the instrumentation data. In one embodiment, only one instrumentation data sample, which is limited to instructions of the tagged instruction group within the GCT 118, is provided during each of those intervals.

The special compressed mode instrumentation data writing timing 200 depicts a timeline 202 that includes two fixed intervals, a first fixed interval 204 and a second fixed interval 206. The two fixed intervals, the first fixed interval 204 and the second fixed interval 206, each correspond to a desired instrumentation data sample interval specified by a user of that instrumentation data. As described above, one embodiment of the present invention generates sample signals 150 at a multiple of the frequency that corresponds to the desired instrumentation sample interval. One embodiment provides sample signals 150 at a multiple of the desired instrumentation data sampling frequency that corresponds to the maximum number of processing cycles required by the processing pipeline of the microprocessor. In the special compressed mode instrumentation data writing timing 200, a twenty-four (24) stage pipeline is used and therefore there are twenty-four (24) sample pulses in each fixed interval corresponding to the desired instrumentation data sample interval. The illustration includes for each sample pulse an indicator 270, which is either an "o" to indicate that the tagged instruction group is the "next-to-complete" instruction group at the time of that sample, or an "x" to indicate that the tagged instruction group is not the "next-to-complete" instruction group at the time of that sample.

The first fixed interval 204 is shown to have a total of 24 sample pulses, labeled S0 210 through S23 222 (with pulses S3-S19 not shown and represented by ellipses to simplify the illustration). In the first fixed interval 204, as reflected by the indicators 270, the first sample S0 210 occurs at a time when the tagged instruction group stored in the GCT 118 is not the "next-to-complete" instruction group. The next sample, the second sample S1 212 occurs when the tagged instruction group is the "next-to-complete" instruction group. As such, the instrumentation data is written and marked as valid for the second sample S1 212. One embodiment of the present invention operates in a "special compressed mode" where sample pulses are not processed after a valid sample pulse, e.g., S1 212 of this example, is encountered. In the "special compressed mode," sample pulses S2 214 through S23 222 are not processed, even if they occur when the tagged instruction group is the "next-to-complete" instruction group. In a "normal compressed mode," the instrumentation data collection processing continues to process sample pulses occurring after the first valid instrumentation data sample of a desired instrumentation sample interval and stores instrumentation data during samples determined to be "valid," i.e., sample pulses that occur when the tagged instruction group is the "next-to-complete" instruction group.

In the "special compressed" mode of writing instrumentation data sample, instrumentation data for the instructions of the tagged instruction group are captured during each fixed interval that corresponds to the desired instrumentation data sample interval until a "valid" sample is obtained. In one embodiment, "valid" samples are defined as samples where the collected instrumentation data is collected for a "tagged" instruction group and that "tagged" instruction group is the "next to complete" instruction group at the time of that instrumentation data sample. In the example of the first fixed interval 204, instrumentation data is collected and written in the "Normal Compressed Mode" after the first sample S1 212 (which is the first valid instrumentation data sample of that interval) if those subsequent samples are also valid. In the illustrated example, samples S20 216 and S22 220 are indicated as "valid" according to indicators 270, which indicates that the tagged instruction group is the "next-to-complete" group at the time of those samples. Samples S2 214, S21 218 and S23 222 are indicated as "not valid" because the tagged instruction group in the GCT 118 is not the "next-to-complete" instruction group at the time of those samples.

The second fixed interval 206 is similarly shown to have another 24 samples, S0 240 through S23 262 (with samples S3-S19 not shown and signified by ellipses to simplify the diagram). In the case of the second fixed interval 206, as reflected by indicators 270, all of the sample pulses that occur before the last sample pulse of that interval, i.e., sample pulses S0 240 through S22 250, are "not valid" because they do not occur when the tagged instruction group within the GCT 118 is the "next-to-complete" instruction group. Similarly, the last sample pulse S23 252 is also "not valid" because the tagged instruction group within the GCT 118 is not the "next-to-complete" instruction group at the time of this last sample pulse. In one embodiment, however, when there are no valid samples during an interval that corresponds to the desired instrumentation data sample rate, the last sample pulse of such an interval triggers storing the collected instrumentation data, with that data marked as "invalid." The capturing of such "invalid" instrumentation data is able to also yield useful performance analysis information, although perhaps less than is available when the tagged instruction group for which correlated instrumentation data samples are collected is the "next-to-complete" instruction group.

Figure 3:
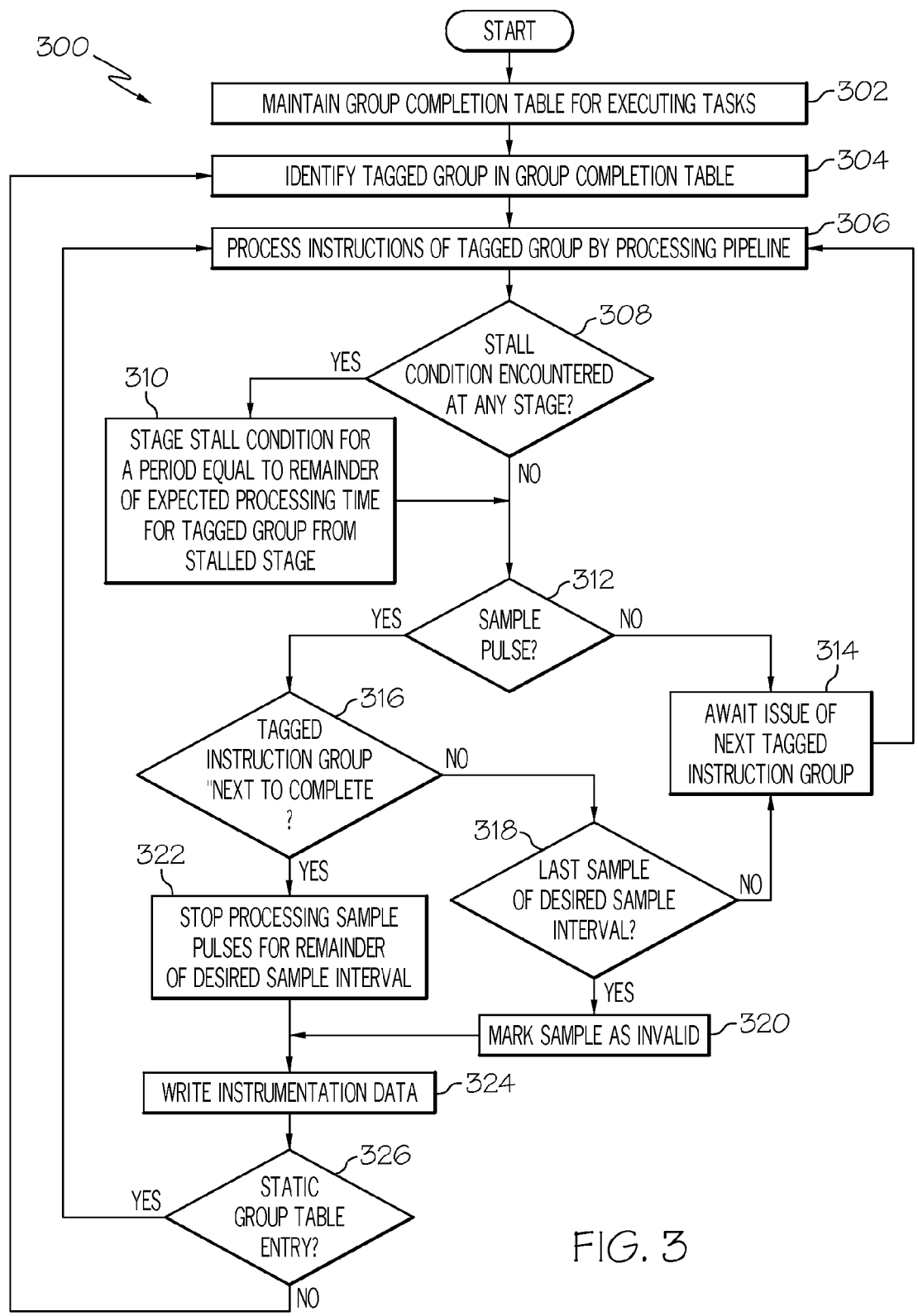
FIG. 3 illustrates a collecting instrumentation data for a tagged instruction group processing flow, in accordance with one embodiment of the present invention.

FIG. 3 illustrates a collecting instrumentation data for a tagged instruction group processing flow 300, in accordance with one embodiment of the present invention. The collecting instrumentation data for a tagged instruction group processing flow 300 begins by maintaining, at 302, a global completion table (GCT) 118. The processing continues by identifying, at 304, a tagged instruction group in the GCT 118. In one embodiment, the tagged instruction group is statically defined and does not change for each iteration of instrumentation data collection. Further embodiments randomly assign the tagged instruction group for each iteration of instrumentation collection.

The processing continues by processing, at 306, instructions of the tagged instruction group by the processing pipeline. A determination is then made, at 308, if a stall condition is encountered at any processing stage of the processing pipeline. If a stall condition is encountered, the stall condition is staged, at 310, for a period equal to the remainder of the expected processing time for the tagged instruction group from the stalled processing stage. As an example, if an instruction group is expected to take eighteen (18) processing cycles and a stall is encountered at a processing stage that is five (5) processing cycles into the processing pipeline, the stall condition is staged for the remaining twelve (12) processing cycles that the tagged instruction was expected to take to execute. The staging of the stall condition allows the condition that delayed completion of the tagged instruction group to be available at the time when sampling the instrumentation data is most accurate, i.e., when the tagged instruction group is the "next-to-complete" instruction group.

In staging the stall condition, it is to be noted that the period of time that a stall condition is staged is the number of processing cycles between the stalled stage and the expected end of the tagged processing group. In the above example, after the stall at the stage that is five (5) processing cycles into the processing pipeline, the total processing time for the instruction group is increased by one cycle due to the stall. If another stall is encountered at the processing stage that is seven (7) processing cycles into the processing pipeline (including the one cycle for which the instruction group was stalled), that stall condition is staged twelve cycles so that it is available after the expected completion of processing of the tagged instruction group considering the time of the encountered processing stalls.

It is to be noted that stall conditions encountered in processing the tagged instruction group in multiple processing stages of the microprocessor processing pipeline are staged by corresponding periods of time such that the stall condition is available after the expected completion time for the tagged instruction group and that multiple stalls are exposed to the instrumentation data collection process as the instruction completes processing.

A determination is then made, at 312, if a sample pulse is encountered after the tagged instruction group is completed. If a sample pulse was not encountered, the processing awaits, at 314, issue of the next tagged instruction group by the Issue Unit 108 and the processing returns to processing, at 306, instructions of the new tagged instruction group.

If a sample pulse was encountered, the processing determines, at 316, if the tagged instruction group is the "next to complete" (NTC) instruction group. If it is not, the processing determines, at 318, if this sample pulse is the last sample pulse of the desired sample interval. As described above with regards to special compressed mode instrumentation data writing timing 200, one embodiment of the present invention generates sample signals 150 at a multiple of the frequency that corresponds to the desired instrumentation sample interval specified by a user of that instrumentation data. If the sample pulse was determined to be the last sample of the desired sample interval, the processing continues by marking, at 320, the sample as invalid. If the sample pulse was determined to not have been the last sample of the desired sample interval, the processing returns to awaiting, at 314, issue of the next tagged instruction group.

If the tagged instruction group was determined to have been the "next-to-complete" instruction group, one embodiment of the present invention continues processing by stopping, at step 322, processing of sample pulses for the remainder of the desired sample interval. Further embodiments are able to be configured to not perform this stopping and continue to process all sample pulses.

After stopping, at 322, the processing of sample pulses for the remainder of the desired sample interval, or after marking, at 320, the sample as invalid, the processing continues by writing the collected instrumentation data, at 324. The processing then continues by determining, at 326, if the tagged instruction group in the GCT 118 is statically defined or randomly determined. If the tagged instruction group is statically defined, the processing returns to processing, at 306, the instructions of the next instruction group that is assigned as the tagged instruction group in the GCT as resources become available according to task issue protocols of the processing pipeline. If the tagged instruction group is not statically defined, the processing returns to identifying, at 304, the tagged group in the GCT 118, as described above.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
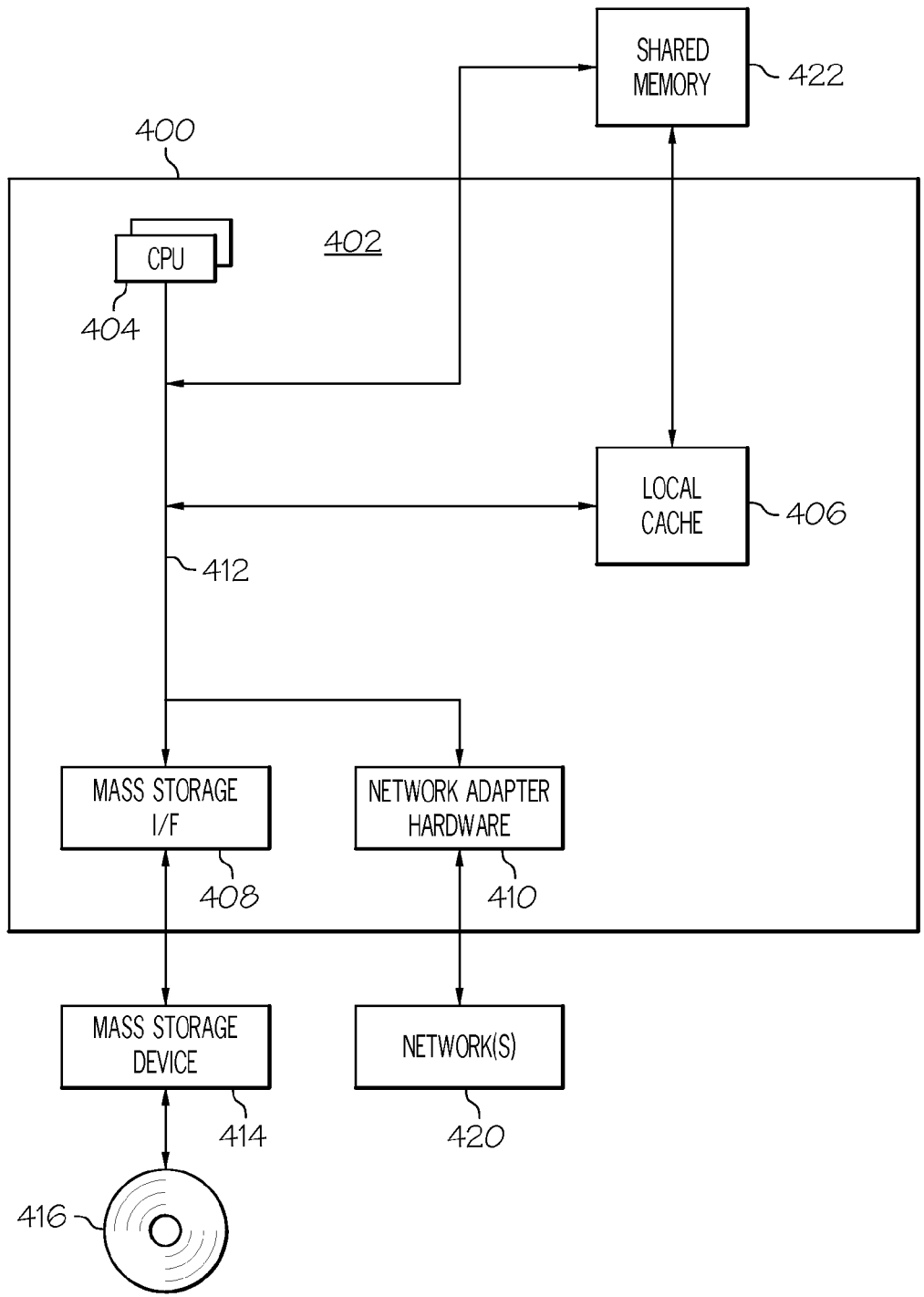
FIG. 4 is a block diagram illustrating an information processing system according to one embodiment of the present invention.

Referring now to FIG. 4, which is a block diagram illustrating an information processing system 400 that can be utilized in conjunction with processor 100 discussed above with respect to FIG. 1. The information processing system 400 is based upon a suitably configured processing system adapted to implement one or more embodiments of the present invention. Similarly, any suitably configured processing system can be used as the information processing system 400 by embodiments of the present invention.

The information processing system 400 includes a computer 402. The computer 402 has a processor(s) 404 that is connected to a local cache memory 406, shared memory 422, mass storage interface 408, and network adapter hardware 410. A system bus 412 interconnects these system components.

The mass storage interface 408 is used to connect mass storage devices, such as data storage device 414, to the information processing system 400. One specific type of data storage device is an optical drive such as a CD/DVD drive, which may be used to store data to and read data from a computer readable medium or storage product such as (but not limited to) a CD/DVD 416. Another type of data storage device is a data storage device configured to support, for example, NTFS type file system operations.

An operating system (not shown) included in the shared memory 422 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 400. The network adapter hardware 410 in one embodiment provides network communications interfaces to one or more networks 420. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for collecting processor instrumentation data, the method comprising:
    marking as a tagged instruction group, within a processor comprising a plurality of pipelined instruction execution stages arranged in an out-of-order execution architecture, one instruction group from within a plurality of instruction groups being simultaneously processed by the plurality of pipelined instruction execution stages;
    storing, by the processor in response to the marking, correlated instrumentation data obtained from execution stages within the plurality of pipelined instruction execution stages while processing the tagged instruction group, the execution stages within the plurality of pipelined instruction execution stages processing the tagged instruction group being fewer than the plurality of pipelined instruction execution stages;
    accepting, at the processor, a sample signal at a sample signal time;
    determining, at a time related to the sample signal time, that the tagged instruction group is indicated as a next-to-complete instruction group;
    writing, in response to determining that the tagged instruction group is indicated as a next-to-complete group at the time related to the sample signal time, the correlated instrumentation data; and
    providing, in response to accepting the sample signal and writing the correlated instrumentation data, the correlated instrumentation data as an instrumentation data output.

2. The method of claim 1, further comprising:
    storing, by the processor, uncorrelated instrumentation data during execution of the tagged instruction group; and
    providing, in response to accepting the sample signal and in conjunction with the providing the correlated instrumentation data, the uncorrelated instrumentation data.

3. The method of claim 1, the storing comprising:
    capturing, at a time of processing the tagged instruction group by the execution stages within the plurality of pipelined instruction execution stages that are processing the tagged instruction group, respective instrumentation data associated with each respective execution stage processing the tagged instruction group;
    storing the respective instrumentation data until after an expected completion time for the tagged instruction group; and
    exposing each of the respective instrumentation data after a respective delay time subsequent to the expected completion time of the tagged instruction group, the respective delay time for each of the respective instrumentation data corresponding to a position within the pipelined instruction execution stages of the respective execution stage associated with the respective instrumentation data being exposed.

4. The method of claim 3, the respective delay time being equal to a number of cycles between the respective execution stage and an end of execution for the tagged instruction group.

5. The method of claim 1, further comprising:
    maintaining a global completion table having a plurality of entries each comprising a respective execution status of a respective instruction group within the plurality of instruction groups being executed by the processor, and
    the marking comprising selecting an instruction group associated with a pre-defined entry in the global completion table as the tagged instruction group.

6. The method of claim 1, further comprising:
    maintaining a global completion table having a plurality of entries each comprising a respective execution status of a respective instruction group within the plurality of instruction groups being executed by the processor;
    maintaining a next target group value,
    the marking comprising selecting, as the tagged instruction group, an instruction group that is associated with the next target group value within the global completion table; and
    setting, in response to accepting the sample signal and determining that the tagged instruction group is indicated as a next-to-complete group, the next target group value to a pseudo-random value.

7. The method of claim 1, further comprising:
    maintaining a global completion table having a pre-determined number of entries each comprising a respective execution status of a respective instruction group within the plurality of instruction groups being executed by the processor;

defining a sample interval period, the providing the correlated instrumentation data as the instrumentation data output being performed at least once during each sample interval period; and generating the sample signal to occur at an interval corresponding to having a sample signal occur at a sample count number of times during each sample interval period, the sample count number equaling the predetermined number of entries.

8. The method of claim 7, further comprising:
halting, in response to determining the tagged instruction group is indicated as the next-to-complete group, providing the correlated instrumentation data as an instrumentation data output.

9. The method of claim 7, the providing being further in response to determining the tagged instruction group is indicated as the next-to-complete group.

10. A system for collecting processor instrumentation data, the system comprising:
an instruction processor having a plurality of pipelined instruction execution stages arranged in an out-of-order execution architecture;
a group tagging processor that marks one instruction group from within a plurality of instruction groups being simultaneously processed by the processor as a tagged instruction group, the tagged instruction group being a subset of the plurality of instruction groups being simultaneously processed by the processor;
an instrumentation data staging circuit that stores, in response to the marking, correlated instrumentation data obtained from execution stages within the plurality of pipelined instruction execution stages processing the tagged instruction group, the execution stages within the plurality of pipelined instruction execution stages processing the tagged instruction group being fewer than the plurality of pipelined instruction execution stages;
a sample signal input that receives a plurality of sample signal pulses, each sample pulse being received at a respective sample signal time;
an instruction group status processor that determines, at a respective time related to each respective sample signal time, that the tagged instruction group is indicated as a next-to-complete instruction group; and
an instrumentation data output that:
writes, in response to determining that the tagged instruction group is indicated as a next-to-complete group at the respective time related to the respective sample time, the correlated instrumentation data; and
provides, in response to accepting the sample signal and writing the correlated instrumentation data, the correlated instrumentation data as an instrumentation data output.

11. The system of claim 10, the instrumentation data staging circuit further stores uncorrelated instrumentation data during execution of the tagged instruction group, and
the instrumentation data output further provides, in response to the sample signal pulses and in conjunction with the providing the correlated instrumentation data, the uncorrelated instrumentation data.

12. The system of claim 10, the instrumentation data staging circuit further:
captures, at a time of processing the tagged instruction group by the execution stages within the plurality of pipelined instruction execution stages that are processing the tagged instruction group, respective instrumentation data associated with each respective execution stage processing the tagged instruction group;
stores the respective instrumentation data until after an expected completion time for the tagged instruction group; and
exposes each of the respective instrumentation data after a respective delay time subsequent to the expected completion time of the tagged instruction group, the respective delay time for each of the respective instrumentation data corresponding to a position within the pipelined instruction execution stages of the respective execution stage associated with the respective instrumentation data being exposed.

13. The system of claim 12, the respective delay time being equal to a number of cycles between the respective execution stage and an end of execution for the tagged instruction group.

14. The system of claim 10, further comprising:
a global completion table having a pre-determined number of entries each comprising a respective execution status of a respective instruction group within the plurality of instruction groups being executed by the processor; and
a sample pulse generator that generates the sample signal pulses at a sample interval period, the instrumentation data output provides the correlated instrumentation data as the instrumentation data output at least once during each sample interval period, the sample interval period being defined to cause sample signal pulses to occur at an interval corresponding to having a sample signal pulse occur at a sample count number of times during each sample interval period, the sample count number equaling the predetermined number of entries.

15. The system of claim 14, the instrumentation data output halting, in response to the instruction group status processor determining the tagged instruction group is indicated as the next-to-complete group, providing the correlated instrumentation data as an instrumentation data output.

16. The system of claim 14, the instrumentation data output further providing the correlated instrumentation data as an instrumentation data output in response to determining the tagged instruction group is indicated as the next-to-complete group.

17. A computer program product for collecting processor instrumentation data, the computer program product comprising:
a non-transitory computer readable storage medium having computer readable program code embodied therewith, the computer readable program code comprising:
computer readable program code configured to mark as a tagged instruction group, within a processor comprising a plurality of pipelined instruction execution stages arranged in an out-of-order execution architecture, one instruction group from within a plurality of instruction groups being simultaneously processed by the plurality of pipelined instruction execution stages;
computer readable program code configured to store, in response to the marking, correlated instrumentation data obtained from execution stages within the plurality of pipelined instruction execution stages while processing the tagged instruction group, the execution stages within the plurality of pipelined instruction execution stages processing the tagged instruction group being fewer than the plurality of pipelined instruction execution stages;
computer readable program code configured to accept a sample signal at a sample signal time;
computer readable program code configured to determine, at a time related to the sample signal time, that the tagged instruction group is indicated as a next-to-complete instruction group;

computer readable program code configured to write, in response to determining that the tagged instruction group is indicated as a next-to-complete group at the time related to the sample signal time, the correlated instrumentation data; and computer readable program code configured to provide, in response to accepting the sample signal and writing the correlated instrumentation data, the correlated instrumentation data as an instrumentation data output.

18. The computer program product of claim 17, the computer readable program code further comprising:

computer readable program code configured to capture, at a time of processing the tagged instruction group by the execution stages within the plurality of pipelined instruction execution stages that are processing the tagged instruction group, respective instrumentation data associated with each the respective execution stage processing the tagged instruction group;

computer readable program code configured to store the respective instrumentation data until after an expected completion time for the tagged instruction group; and computer readable program code configured to expose each of the respective instrumentation data after a respective delay time subsequent to the expected completion time of the tagged instruction group, the respective delay time for each of the respective instrumentation data corresponding to a position within the pipelined instruction execution stages of the respective execution stage associated with the respective instrumentation data being exposed.

19. The computer program product of claim 17, the computer readable program code further comprising:

computer readable program code configured to maintain a global completion table having a pre-determined number of entries each comprising a respective execution status of a respective instruction group within the plurality of instruction groups being executed by the processor;

computer readable program code configured to define a sample interval period, the providing the correlated instrumentation data as the instrumentation data output being performed at least once during each sample interval period; and computer readable program code configured to generate the sample signal to occur at an interval corresponding to having a sample signal occur at a sample count number of times during each sample interval period, the sample count number equaling the predetermined number of entries.

20. The computer program product of claim 17, the computer readable program code further comprising:

computer readable program code configured to halt, in response to determining the tagged instruction group is indicated as the next-to-complete group, providing the correlated instrumentation data as an instrumentation data output.

\* \* \* \* \*